United States Patent
Wu

(10) Patent No.: US 11,930,051 B2
(45) Date of Patent: Mar. 12, 2024

(54) NETWORK SERVICE SYSTEM, COMPUTER STORAGE MEDIUM FOR COMMUNICATION, AND NETWORK SERVICE METHOD

(71) Applicant: Enping Wu, Beijing (TW)

(72) Inventor: Enping Wu, Beijing (TW)

( * ) Notice: Subject to any disclaimer, the term of this patent is extended or adjusted under 35 U.S.C. 154(b) by 0 days.

(21) Appl. No.: 17/630,872

(22) PCT Filed: Jan. 13, 2021

(86) PCT No.: PCT/CN2021/071459
§ 371 (c)(1),
(2) Date: Jan. 27, 2022

(87) PCT Pub. No.: WO2021/143719
PCT Pub. Date: Jul. 22, 2021

(65) Prior Publication Data
US 2022/0279025 A1     Sep. 1, 2022

(30) Foreign Application Priority Data

Jan. 13, 2020   (CN) .......................... 202010034950.1
Mar. 6, 2020    (CN) .......................... 202010155018.4

(51) Int. Cl.
*H04M 3/00*     (2006.01)
*G10L 15/26*    (2006.01)
(Continued)

(52) U.S. Cl.
CPC .......... *H04L 65/1069* (2013.01); *G10L 15/26* (2013.01); *H04L 61/4557* (2022.05);
(Continued)

(58) Field of Classification Search
CPC .................................................. H04L 65/1069
(Continued)

(56) References Cited

U.S. PATENT DOCUMENTS 8,019,066 B1 *  9/2011  Efrati ................. H04N 1/00127
                                                379/201.01
10,454,921 B1 * 10/2019  Chen ................... H04L 63/0428
(Continued)

FOREIGN PATENT DOCUMENTS

CN   101014051 A   8/2007
CN   102572687 A   7/2012
(Continued)

OTHER PUBLICATIONS

Taiwan Office Action dated May 17, 2022, in counterpart Taiwan application TW111100612, 25 pages in Chinese and 1 page English summary.
(Continued)

*Primary Examiner* — William J Deane, Jr.
(74) *Attorney, Agent, or Firm* — Juan Carlos A. Marquez; Marquez IP Law Office, PLLC

(57) ABSTRACT

A network service system, a computer storage medium for communication, and a network service method are provided. The system includes: a communication module and a data processor, the data processor including a storage module, the storage module storing an identification code; and the communication module is configured to receive a communication request from a user terminal, the communication request including the identification code; and the communication module is further configured to establish a communication connection to a target terminal according to the identification code set by the network service system and a target code, the target code enabling the target terminal to communicate with the user terminal in real time by using an Internet Protocol (IP) network.

20 Claims, 4 Drawing Sheets

(51) Int. Cl.
| | |
|---|---|
| *H04L 61/4557* | (2022.01) |
| *H04L 61/5007* | (2022.01) |
| *H04L 65/1069* | (2022.01) |
| *H04L 65/1073* | (2022.01) |
| *H04L 65/1101* | (2022.01) |
| *H04L 65/80* | (2022.01) |
| *H04M 3/42* | (2006.01) |
| *H04M 3/51* | (2006.01) |
| *H04M 7/00* | (2006.01) |
| *H04W 4/02* | (2018.01) |

(52) U.S. Cl.
CPC ...... *H04L 61/5007* (2022.05); *H04L 65/1073* (2013.01); *H04L 65/1101* (2022.05); *H04L 65/80* (2013.01); *H04M 3/42008* (2013.01); *H04M 3/5191* (2013.01); *H04M 7/0039* (2013.01); *H04W 4/02* (2013.01)

(58) Field of Classification Search
USPC .................................................. 379/265.09
See application file for complete search history.

(56) References Cited

U.S. PATENT DOCUMENTS

| | | | | |
|---|---|---|---|---|
| 10,462,298 | B2* | 10/2019 | Firke | H04M 1/72403 |
| 2015/0112826 | A1 | 4/2015 | Crutchfield | |
| 2016/0007150 | A1 | 1/2016 | Finlow-Bates et al. | |
| 2016/0381094 | A1 | 12/2016 | Inoue | |
| 2018/0198914 | A1* | 7/2018 | Firke | H04M 1/72403 |
| 2019/0166484 | A1 | 5/2019 | Chauhan et al. | |
| 2021/0149532 | A1 | 5/2021 | Yoon et al. | |

FOREIGN PATENT DOCUMENTS

| | | |
|---|---|---|
| CN | 103986716 A | 8/2014 |
| CN | 103986746 A | 8/2014 |
| CN | 105827459 A | 8/2016 |
| CN | 106851037 A | 6/2017 |
| CN | 110427455 A | 11/2019 |
| CN | 111371793 A | 7/2020 |
| JP | 2001197207 A | 7/2001 |
| JP | 2008098939 A | 4/2008 |
| JP | 2008219111 A | 9/2008 |
| JP | 2010034647 A | 2/2010 |
| JP | 2015111330 A | 6/2015 |
| TW | I675572 B | 10/2019 |
| WO | 2006/107034 A1 | 10/2006 |

OTHER PUBLICATIONS

Chinese Office Action dated May 11, 2022, in counterpart Chinese application CN202180000122.9, 8 pages in Chinese and 1 page English summary.
PCT Published Application with International Search Report dated Apr. 1, 2021, in counterpart PCT application PCT/2021/071459, 32 pages in Chinese.
Office Action in U.S. Appl. No. 16/877,461 dated Sep. 9, 2021, 14 pages.
Japan Office Action dated Jul. 4, 2023, in counterpart Japanese application JP2022-523109, 7 pages in Japanese and 7 pages of English translation.
European Extendd Search Report dated Aug. 17, 2023 in counterpart European application EP 21 741 673,4, 6 pages in English.
Japanese office action dated Dec. 19, 2023, in counterpart Japanese application JP 2022-523109, 4 pages in Japanese.
Japanese office action dated Dec. 19, 2023, in counterpart Japanese application JP 2022-523109, 4 pages in English.

* cited by examiner

NETWORK SERVICE SYSTEM, COMPUTER STORAGE MEDIUM FOR COMMUNICATION, AND NETWORK SERVICE METHOD

The present application is a National Stage application of PCT international application PCT/CN2021/071459, filed on Jan. 13, 2021, which claims the benefit of priority from the China Patent Application No. 202010034950.1, filed on Jan. 13, 2020, and China Patent Application No. 202010155018.4, filed on Mar. 6, 2020, the disclosures of which are hereby incorporated by reference in their entireties.

BACKGROUND OF THE INVENTION

1. Field of the Invention

The present invention relates to the field of network service technologies, and, particularly, a network service system, a computer storage medium for communication, and a network service method.

2. Description of the Related Art

With continuous economic development and improvement in the quality of industrial services, many enterprises provide "customer service phone numbers" for services or products that they provide, so that when consultation is needed, customers may dial the "customer service phone numbers" to avail themselves of the consultation services. However, currently, when dialing a "customer service phone number," customers need to convey their background information, product information, or service information to the enterprise they are calling. For example, a "customer service phone number" of an auto insurance company is dialed; after the call is answered, users may further need to dictate personal information, auto insurance policy information, information about an accident location, etc., to the enterprise, the result of which is inefficient service, or service that is not provided in timely manner in the event of an emergency.

SUMMARY OF THE INVENTION

To resolve the current problem of customer service calls causing a huge financial burden to enterprises, the present invention provides a network service system, a computer storage medium for communication, and a network service method.

To resolve the foregoing technical problem, the present invention provides the following technical solution: A network service system is provided, operably communicating with a remote user terminal and a remote target terminal, the network service system including: a communication module and a data processor, wherein the data processor includes a storage module, the storage module storing an identification code; and the communication module is configured to receive a communication request from the user terminal, the communication request including the identification code, and the communication module is further configured to establish a communication connection to the target terminal according to the identification code set by the network service system and a target code associated with the target terminal, so that the target terminal communicates with the user terminal in real time by using an Internet Protocol (IP) network.

To resolve the foregoing technical problem, the present invention provides the following technical solution: A network service method is provided, operable by a network service system, the network service method including: receiving a communication request from a user terminal, the communication request including an identification code set by the network service system; and communicably connecting to a target terminal by using an IP network according to the identification code included in the communication request and a target code, so that the user terminal communicates with the target terminal in real time.

PREFERRED EMBODIMENT OF THE PRESENT INVENTION

To make the objectives, technical solutions, and advantages of the present invention clearer and more comprehensible, the following describes the present invention in further detail with reference to the accompanying drawings and embodiments. It should be understood that the specific embodiments described herein are merely used to explain the present invention but are not intended to limit the present invention.

Figure 1:
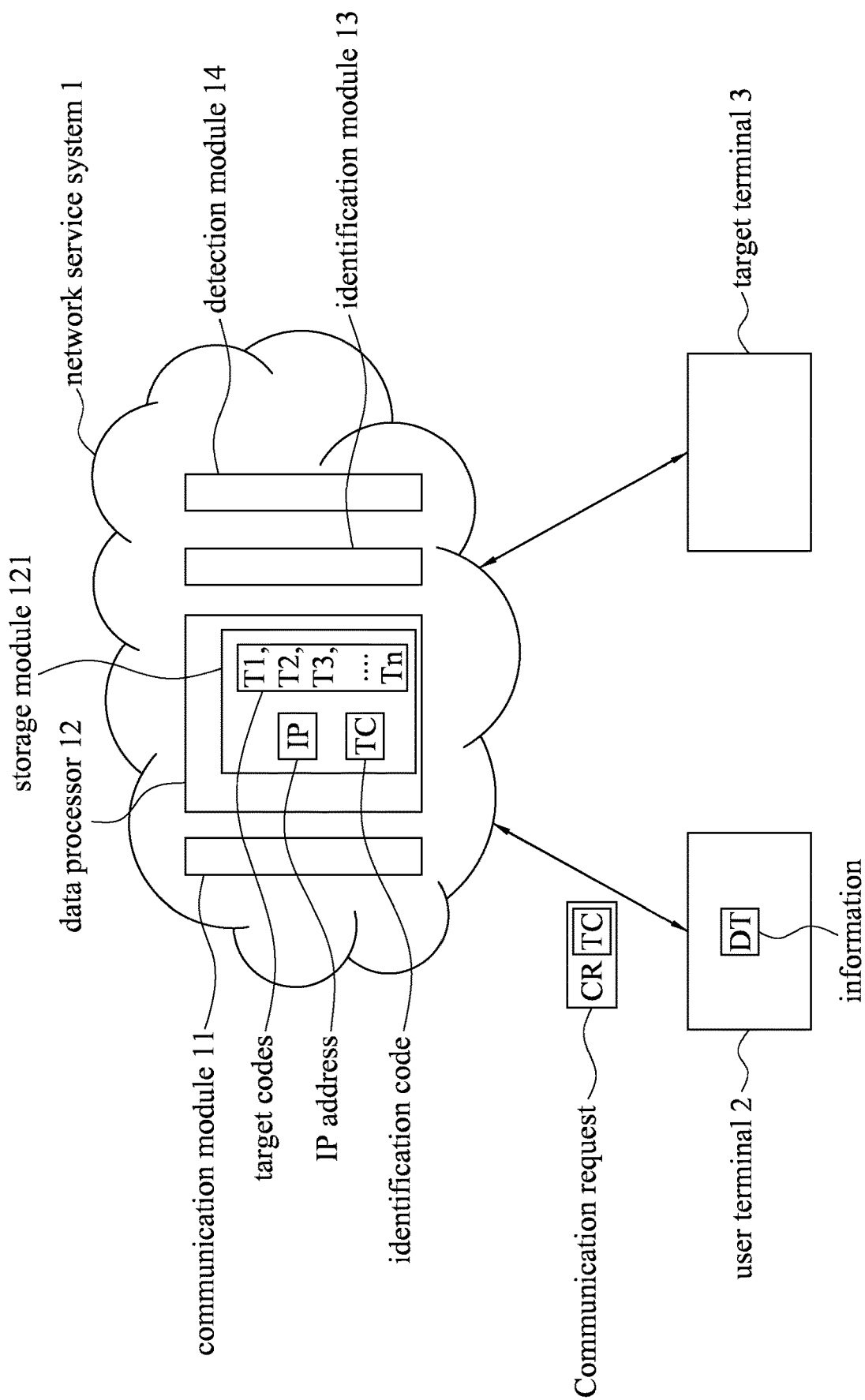
FIG. 1 is a schematic diagram of a network service system in a wireless communication network according to some embodiments of the present invention.

FIG. 1 is a schematic diagram of a network service system 1 in a wireless communication network according to some embodiments of the present invention. As shown in FIG. 1, a network service system 1, a user terminal 2, and a target terminal 3 are in a communication network.

The user terminal 2 may be a personal mobile phone, a tablet computer, or a computer. The user terminal 2 may include a camera and a processor. The processor can analyze an image captured by the camera.

The target terminal 3 refers to an organization, a company, or a group, for example, Baidu Inc. and Alibaba Group.

The network service system 1 may establish communication with the user terminal 2. The network service system 1 may establish communication with the user terminal 2 by using at least one of a wireless network, a fiber optic network, and a blockchain network.

The network service system 1 may establish communication with the target terminal 3. The network service system 1 may establish communication with the target terminal 3 by using a wireless network, a fiber optic network, and a blockchain network.

The user terminal 2 may establish communication with the target terminal 3 by using the network service system 1.

The network service system 1 may be an integrated system. In some embodiments, the network service system 1 may be a distributed system. In some embodiments, the network service system 1 may be a cloud system.

The network service system 1 includes a communication module 11 and a data processor 12. The communication module 11 and the data processor 12 may be electrically connected or network-connected. Information, signals, data, or instructions may be transferred between the communication module 11 and the data processor 12.

The communication module 11 may receive data from the user terminal 2. The communication module 11 may receive data from the target terminal 3. The communication module 11 may transmit data to the user terminal 2. The communication module 11 may transmit data to the target terminal 3.

The data processor 12 may set an identification code TC for each target terminal. For example, 001 is set to represent Baidu Inc., 002 is set to represent Alibaba Group, and 003 is set to represent Lenovo Group Limited.

The data processor 12 may include a storage module 121. The storage module 121 stores at least one of target codes T1, T2, T3 . . . Tn associated with the target terminal 3, n being a positive integer. The target code may include a communication number, for example, a phone number T1 of the target terminal 3, a social network account T2, for example, a microblog account T3, a WeChat account T4, a Facebook account T5, an Instagram account T6, and/or a LINE account T7, and an application (app) account T8 related to the network service system 1. The target code may include a communication mode, and the target codes T1, T2, T3 . . . Tn may represent a code of any communication tool that can communicate with the target terminal 3 in real time. The communication mode may be at least one of voice communication and video communication.

The storage module 121 may further store the identification code TC set by the network service system 1.

The data processor 12 may store the data received by the communication module 11 in the storage module 121 as empirical data of a user. According to the empirical data of the user collected from the user terminal 2, the network service system 1 may learn the preferences and habits of the user through statistical operations as a reference for advertising targets.

The network service system 1 may further include an identification module 13. The identification module 13 may generate a target-specific identifier SM. The target-specific identifier SM may include an IP address of the network service system 1 and the identification code TC.

In another embodiment, the target-specific identifier SM (not shown in the figure) is generated by an external apparatus of the network service system 1.

In some embodiments, the target-specific identifier SM is generated according to the identification code TC set by the network service system 1, and may be generated by the network service system 1 or an external system of the network service system 1.

In some embodiments, the target-specific identifier SM is generated according to the identification code TC set by the network service system 1 and the IP address of the network service system 1. The target-specific identifier SM may be generated by the network service system 1 or an external system of the network service system 1.

The target-specific identifier SM may be a one-dimensional barcode, a two-dimensional barcode, a barcode, or another unique identifier that can carry information, which is not specifically limited in this embodiment of the present invention. The two-dimensional barcode may be a standardized QR code, or may be a Data Matrix code or any two-dimensional pattern from which information can be read through scanning, which is not limited to the shape of a barcode. In some embodiments, the target-specific identifier SM may alternatively be a specific pattern or a combination of one or more of a digit, a letter, and a symbol.

The data processor 12 may determine that the identification code TC included in the target-specific identifier SM is associated with the target codes T1, T2, T3 . . . Tn. For example, it is determined that an identification code number 001 is associated with a phone number T1, a social network account T2, for example, a microblog account T3, a WeChat account T4, a Facebook account T5, an Instagram account T6, and/or a LINE account T7, and an app account T8 related to the network service system 1.

The target-specific identifier SM may be substantialized on some carriers. The carriers may include, but are not limited to, paper, plastic, metal, glass, wood, and a display screen. The target-specific identifier SM may be shown in an advertisement, on a credit card, in an auto insurance contract bill, and/or on a mobile phone display screen. In some embodiments, manners in which a carrier carries a specific identifier may include, but are not limited to, printing, spray coating, laser, and electronic digit display, provided that each target-specific identifier is a unique identifier and carries specified information.

The user terminal 2 may "analyze" information included in the target-specific identifier SM. Through the user terminal 2, the target-specific identifier SM may be captured, photographed, scanned, touched, or mouse clicked. For example, the user terminal 2 may include a camera, configured to capture and photograph an image of the target-specific identifier SM, to further analyze the target-specific identifier SM. The user terminal 2 may include an electronic display, where the target-specific identifier SM on the electronic display is "clicked" by using a mouse, to further analyze the target-specific identifier SM. The user terminal 2 may include a touch display, where the target-specific identifier SM on the electronic display is "touched" by a user or by an object held by a user, to further analyze the target-specific identifier SM. In some embodiments, the user terminal 2 may scan the target-specific identifier SM and analyze the target-specific identifier SM by using the processor of the user terminal 2.

By analyzing information carried in the target-specific identifier SM, for example, information about the foregoing IP address of the network service system 1 and the identification code TC corresponding to the target terminal 3, the user terminal 2 transmits a communication request CR to the network service system 1. The communication request CR may be associated with the target-specific identifier SM. In some embodiments, the communication request CR may include the identification code TC. In some embodiments, after analyzing the target-specific identifier SM, the user terminal 2 generates the communication request CR. In some embodiments, the communication request CR is associated with information about the target-specific identifier SM (for example, the information about the IP address of the network service system 1 and the identification code TC corresponding to the target terminal 3).

When the communication module 11 of the network service system 1 receives the communication request CR from the user terminal 2, the communication module 11 may determine, according to the communication request CR, whether an identification code TC included in the communication request CR is the identification code TC set by the network service system 1. The communication module 11 may find a corresponding target code group of the target terminal 3 according to the identification code TC. The communication module 11 may determine, according to the identification code TC, to establish a communication connection to the target terminal 3 by using at least one of the target codes T1, T2, T3 . . . Tn associated with the target terminal 3, so that the target terminal 3 communicates with the user terminal 2 in real time by using an IP network. The real-time communication between user terminal 2 and the target terminal 3 is video communication or voice communication. The communication module 11 may transfer information between the user terminal 2 and the target terminal 3 during communication.

In some embodiments, when receiving the communication request CR from the user terminal 2, the communication module of the network service system 1 determines whether the identification code TC is in a service contract period of the network service system 1. If the identification code TC is in the service contract period of the network service system 1, the communication module 11 establishes real-time communication between the user terminal 2 and the target terminal 3 by using an IP network. If the identification code TC is not in the service contract period of the network service system 1, the communication module 11 cannot establish real-time communication between the user terminal 2 and the target terminal 3.

The real-time communication between the user terminal 2 and the target terminal 3 may be performed by using the Voice over Internet Protocol (VoIP). The real-time communication between the user terminal 2 and the target terminal 3 may be performed by using a Public Switched Telephone Network (PSTN). In some embodiments, the network service system 1 receives the communication request CR from the user terminal 2, then establishes real-time communication between the user terminal 2 and the target terminal 3 by using an IP network and a PSTN. For example, the real-time communication may be performed through cooperation between the VoIP and the PSTN.

In some embodiments, when determining that the identification code TC is not in the service contract period of the network service system 1, the network service system 1 cannot establish real-time communication between the user terminal 2 and the target terminal 3.

The data processor 12 of the network service system 1 may set and update, for example, change, add, or delete the target codes T1, T2, T3 . . . Tn related to the identification code.

In some embodiments, the target terminal 3 may transmit an instruction to the network service system 1, and the target codes T1, T2, T3 . . . Tn associated with the target terminal 3 are set or updated, for example, changed, added, or deleted by the network service system 1. For example, a phone number for communication with the target terminal 3, a social network account, for example, a microblog account, a WeChat account, a Facebook account, an Instagram account, and/or a LINE account, an app account related to the network service system 1, or an account in another communication mode may all be set and updated.

According to the update of the target codes T1, T2, T3 . . . Tn, the network service system 1 may make the identification code TC included in the target-specific identifier SM corresponding to a current valid target terminal 3 (which, is, for example, in the service contract period of the network service system 1) while keeping the target-specific identifier SM unchanged. As such, a situation in which the user terminal 2 cannot communicate with the target terminal 3 after analyzing the target-specific identifier SM can be effectively avoided.

In some embodiments, the communication module 11 determines an optimal communication mode by using two or more communication tools represented by the target codes T1, T2, T3 . . . Tn, and may determine the most efficient communication mode according to at least one condition such as network communication speed, network bandwidth, communication quality, communication effectiveness, and a device of the user terminal 2.

Further, the target-specific identifier SM may be embedded into the identity information of a user associated with the user terminal 2. For example, the target-specific identifier SM generated for a specific user by the target terminal includes the personal identification information of the user, and the target-specific identifier SM is printed on or stuck to a credit card or membership card. After the user terminal transmits a communication request CR to the network service system 1 by using the target-specific identifier SM, a specialist specifically serving the user on the target terminal 3 may be connected to by using the network service system 1, and the specialist can learn of the specific user that the specialist is communicating with online, thereby helping the specialist to serve the user efficiently.

In some embodiments, the communication module 11 of the network service system 1 may determine user group information corresponding to the target-specific identifier SM. For example, the target-specific identifier SM may correspond to a database related to the network service system 1 or the target terminal 3. For example, user group information of a Customer Relation Management (CRM) includes, but is not limited to, personal information (for example, a VIP of a bank), product information (for example, a model of an air conditioner or a model of an automobile), and service information (for example, an insurance product and a loan service). Therefore, when the user terminal 2 analyzes the target-specific identifier SM and transmits a communication request CR to the network service system 1 (the communication request CR further including user group information), after receiving the communication request CR, the network service system 1 may determine, according to the identification code TC and the user group information included in the communication request CR, a target code corresponding to the user group, and then determine that a specialist specified for a specific user group or specific product on the target terminal 3 may be connected to by using a specific target code (for example, a phone number T1) or a specific group of target codes (for example, a phone number T1, a social network account T2, and a microblog account T3) and by using the network service system 1. In addition, the specialist can learn of the user of a specific group or the user having problems with a specific product that the specialist is communicating with online, thereby helping the specialist to serve the user efficiently.

In some embodiments, after the real time-communication between the user terminal 2 and the target terminal 3 is established by the network service system 1, the network service system 1 is used as a communication medium during communication, to transfer information exchanged between the user terminal 2 and the target terminal 3. In some embodiments, the network service system 1 may further store the conversation between the user terminal 2 and the target terminal 3.

In some embodiments, after the target terminal 3 directly communicates with the user terminal 2, the communication module 11 of the network service system 1 disconnects respective communication connections to the user terminal 2 and the target terminal 3, so that real-time communication between the user terminal 2 and the target terminal 3 is performed without using the network service system 1.

In some embodiments, after the real time-communication between the user terminal 2 and the target terminal 3 is established by the network service system 1, the target terminal 3 may directly communicate with the user terminal 2 without using the network service system 1. The target terminal 3 may directly communicate with the user terminal 2 by using one or both the VoIP and the PSTN network.

In some embodiments, the target terminal 3 has an app that can perform real-time communication by using the VoIP, based on the IP address of the user terminal 2.

The communication request CR transmitted by the user terminal 2 may include the IP address of the user terminal 2. After receiving the communication request CR, the network service system 1 may transmit the IP address of the user terminal 2 included in the communication request CR to the target terminal 3, so that the target terminal 3 can communicate with the user terminal 2 in real time by using the VoIP.

In some embodiments, after obtaining permission from the user terminal 2, the communication module 11 may transmit information about the user terminal 2, for example, information such as a phone number and a social network account, to the target terminal 3. Therefore, when necessary, the target terminal 3 may directly establish, without using the network service system 1, communication with the user terminal 2 according to the information about the user terminal 2 transmitted from the network service system 1.

In some embodiments, the target terminal 3 may download an app related to the network service system 1, then register and log in to the app to a virtual phone number, and furthermore, send the virtual phone number generated in the app back to the network service system 1 as at least one of the target codes T1, T2, T3 . . . Tn of the target terminal 3, which is stored by the storage module 121.

The foregoing communication methods improve diversity of the communication mode options, especially for a call made by using a virtual phone number, which can greatly reduce communication fees for a user of the user terminal or a user of the target terminal.

The network service system 1 may further include a detection module 14. The detection module 14 may be configured to detect information DT about the user terminal 2, for example, information such as a language setting and a location of the user terminal 2. The communication module may further transmit the information DT received by the detection module 14 to the target terminal 3.

In some embodiments, a communication pattern of the target terminal 3 may include a plurality of language settings, for example, Chinese, English, Japanese, and Korean. The detection module 14 of the network service system 1 may detect the information DT about the user terminal 2, the information DT including a language setting of the user terminal 2. The communication module 11 of the network service system 1 may further select, according to the language setting in the information DT and by determining at least one of the target codes T1, T2, T3 . . . Tn, the target terminal 3 using the same language as the user terminal 2, then establish a communication connection with the selected target terminal 3.

The network service system 1 further select a target terminal 3 according to the information DT, then choose the language setting of the target terminal 3 correspond to the information DT (for example, the language setting) of the user terminal 2. For example, assuming that the language setting is Chinese, the network service system 1 may connect to a target terminal corresponding to a customer service person using Chinese as a language to request communication, so that the user experience can be improved, and a failure of normal communication caused by a language barrier can be avoided. Particularly for an emergency call, once the communication is established, a call can be directly made to avail oneself of a service without having to select a proper person to speak with due to a failure of normal communication caused by a language barrier. Calling efficiency is thus improved.

In some embodiments, the network service system 1 may perform automatic translation for both the user terminal 2 and the target terminal 3 according to the detected language setting of the user terminal 2 and the detected language setting of the target terminal 3. In an embodiment, the data processor 12 of the network service system 1 may perform automatic translation for both the user terminal 2 and the target terminal 3. For example, when the network service system 1 detects that the language setting of the user terminal 2 is Chinese, and the language setting of the target terminal 3 is English, the network service system 1 may automatically translate Chinese information transmitted from the user terminal 2 into English and transmit the English information to the target terminal 3, and automatically translate English information of the target terminal 3 into Chinese and transmit the Chinese information to the user terminal 2, so that the user terminal 2 and the target terminal 3 may communicate with each other by using a language with which the terminal 2 or the target terminal 3 is familiar.

In some embodiments, the information DT about the user terminal 2 may include user identification information of the user terminal 2, for example, a personal mobile phone number, personal identification information, user identification information (for example, identification information of a SIM card) of a personal mobile phone, identification information of a tablet computer, or identification information of a computer. According to the detected user identification information of the user terminal 2, the network service system 1 may compare the detected user identification information with user information in the database (for example, a customer service system) related to the network service system 1 or target terminal 3 with the permission of the user, so that whether the user terminal 2 transmitting the communication request to the network service system 1 corresponds to user data in the database related to the network service system 1 or target terminal 3 can be further identified, but this application is not limited thereto.

For example, when a user reports a loss to a credit card issuing bank after losing a credit card, the network service system 1 may capture user identification information in the user terminal 2, and determine, by using the database related to the network service system 1 or target terminal 3 (for example, the card issuing bank), whether the user corresponds to a cardholder of the credit card that needs to be reported as lost.

In some embodiments, the information DT about the user terminal 2 may include location information of the user terminal 2. The detection module 14 may detect the information DT, including the location information, about the user terminal 2. The communication module 11 may transmit the location information to the target terminal 3, and the target terminal 3 may learn a user location associated with the user terminal 2 according to the location information of the user terminal 2, so that the target terminal 3 generates a service suitable for the user in real time.

In some embodiments, the information DT about the user terminal 2 may include information about the IP address of the user terminal 2.

In some embodiments, a Global Positioning System (GPS) module is built in the user terminal 2, so that the network service system 1 may detect GPS information about the user terminal, to obtain the location information of the user terminal 2.

In some embodiments, the user terminal 2 may alternatively obtain the location information according to other satellite positioning systems having functions similar to those of the GPS, including the BeiDou satellite positioning system of China, the GALILEO satellite positioning system of the European Union, and the GLONASS satellite positioning system of Russia, provided that the location information can be transformed into a target location of the user terminal 2 on an electronic map.

In some embodiments, after capturing and photographing the target-specific identifier SM on a carrier by using the camera, the user terminal 2 may store the target-specific identifier SM in a memory of the user terminal 2. When the user terminal 2 needs to establish communication with the target terminal 3 the next time, the target-specific identifier SM stored in the memory of the user terminal 2 may be read again, and after the target-specific identifier SM is touched, mouse clicked, or scanned, the processor of the user terminal 2 analyzes the target-specific identifier SM. The user terminal 2 transmits a communication request CR to the network service system 1 again by analyzing the target-specific identifier SM.

In some embodiments, the user terminal 2 may store the target-specific identifier SM, to help the user terminal 2 to read the target-specific identifier SM from the internal memory thereof the next time, analyze the target-specific identifier SM, and transmit the communication request CR to the network service system 1 to establish real-time communication with the target terminal 3.

In some embodiments, the user terminal 2 may transmit the stored target-specific identifier SM to another user terminal in a known communication mode, so that the other user terminal may also transmit a communication request for the target terminal 3 to the network service system 1 by using the same target-specific identifier SM.

It may be understood that the user terminal 2 may enable, by only "analyzing" the target-specific identifier SM, the network service system 1 to determine, according to the identification code TC, to communicate with the corresponding target terminal 3 by using at least one of the target codes T1, T2, T3 . . . Tn (including a specified communication number and a specified communication mode). Therefore, a user to which the user terminal 2 belongs can avail himself/herself of a service in an emergency without searching for contact information of the target terminal 3 in a complex manner Calling efficiency is thus improved.

In addition, the user terminal 2 communicates with the target terminal 3 by using the network service system 1 according to the target-specific identifier SM, and the network service system 1 does not need to be bound to hardware of a specific target terminal 3. Provided that a communication number (or a virtual phone number) of the user terminal 3 is set in the network service system 1, the network service system 1 can communicate with the target terminal 3. In other words, the network service system 1 communicates with a target terminal 3 by using a communication mode and a communication number set by the network service system 1 in the target-specific identifier SM, and the target terminal 3 is not limited to specific hardware.

The user terminal 2 may be configured to perform the following steps:

(1) Capture, mouse click, touch, or scan the target-specific identifier SM associated with the remote target terminal 3, the target-specific identifier SM including the identification code TC corresponding to the target terminal 3. In some embodiments, the camera of the user terminal 2 captures the target-specific identifier SM. The user terminal 2 may include an electronic display, where the target-specific identifier SM on the electronic display is clicked on by using a mouse. The user terminal 2 may include a touch display, where the target-specific identifier SM on the electronic display is touched by the user or by an object held by the user. The user terminal 2 may capture the target-specific identifier SM by using a network.

(2) Analyze the target-specific identifier SM, to generate a communication request CR for establishing IP network communication with the target terminal 3, the communication request CR including an identification code TC. The user terminal 2 may include a processor, to analyze the target-specific identifier SM. The communication request CR is associated with the information (for example, the identification code TC) about the target-specific identifier SM.

(3) Transmit the communication request CR to the remote network service system 1 by using a network.

(4) Store the target-specific identifier SM in the user terminal 2. In some embodiments, the target-specific identifier may be stored in an address book of the user terminal.

The foregoing steps are merely exemplary, and do not necessarily need to be performed according to a specific sequence.

Through the user terminal 2, the target-specific identifier SM is captured, mouse clicked, touched, or scanned, so that the user terminal 2 analyzes the target-specific identifier SM, and then makes the communication request CR to the network service system 1 according to the target-specific identifier SM without dialing a long string of numbers, so that time can be saved, thereby improving efficiency of a call.

In addition, the user terminal 2 may further output prompt information, for example, "Touch to call" or "Mouse click to call," while outputting the target-specific identifier SM, to prompt the user to perform an operation on (for example, press or click by using a mouse) the target-specific identifier SM for communication, thereby further improving user experience.

Figure 2:
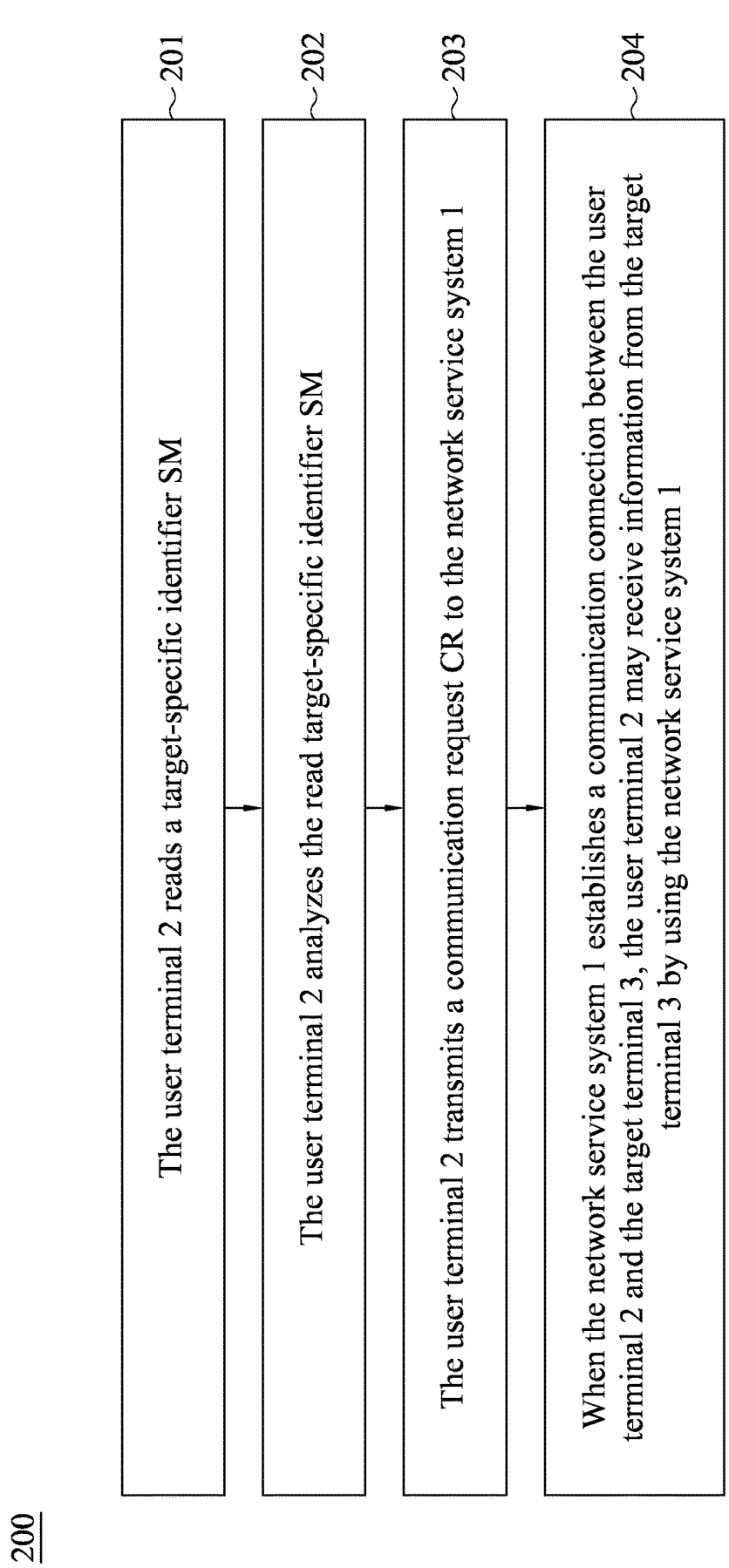
FIG. 2 is a schematic flowchart of steps of a network service method 200 in some embodiments of a user terminal 2 according to the present invention.

FIG. 2 is a schematic flowchart of steps of a network service method 200 in some embodiments of a user terminal 2 according to the present invention.

In operation 201, the user terminal 2 reads a target-specific identifier SM. The target-specific identifier SM may be read by using a camera, may be read from network information, or may be read from data in the internal memory.

In operation 202, the user terminal 2 analyzes the read target-specific identifier SM, the target-specific identifier SM including information about an IP address of the network service system 1 and an identification code TC corresponding to the target terminal 3.

In operation 203, the user terminal 2 transmits a communication request CR to the network service system 1, the communication request CR being associated with the target-specific identifier SM.

In operation 204, when the network service system 1 establishes a communication connection between the user terminal 2 and the target terminal 3, the user terminal 2 may receive information from the target terminal 3 by using the network service system 1. In some embodiments, the user terminal 2 may directly receive information from the target terminal 3 without using the network service system 1.

Figure 3:
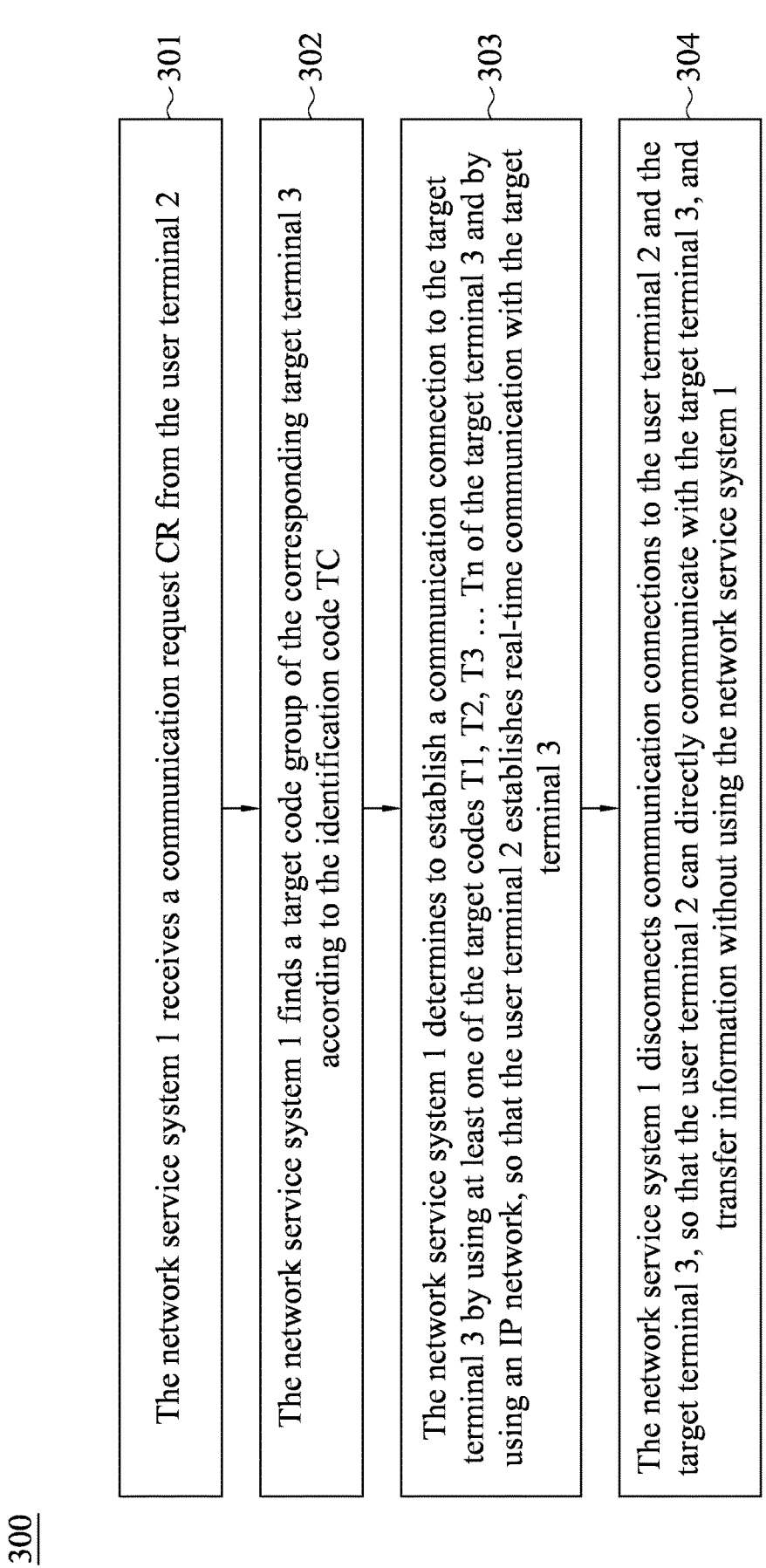
FIG. 3 is a schematic flowchart of steps of a network service method 300 in some embodiments of a network service system 1 according to the present invention.

FIG. 3 is a schematic flowchart of steps of a network service method 300 in some embodiments of a network service system 1 according to the present invention.

In operation 301, the network service system 1 receives a communication request CR from the user terminal 2. The communication request CR may include an IP address of the network service system 1 and an identification code TC associated with the target terminal 3.

In operation 302, the network service system 1 finds a target code group of the corresponding target terminal 3 according to the identification code TC, the target code group including at least one of target codes T1, T2, T3 . . . Tn of the target terminal 3.

In operation 303, the network service system 1 determines to establish a communication connection to the target terminal 3 by using at least one of the target codes T1, T2, T3 . . . Tn of the target terminal 3 and by using an IP network, so that the user terminal 2 establishes real-time communication with the target terminal 3.

In operation 303, the network service system 1 may further detect information DT about the user terminal 2, the information DT including a language setting of the user terminal 2.

The network service system 1 may further select, according to the language setting in the information DT and by determining at least one of the target codes T1, T2, T3 . . . Tn, the target terminal 3 using the same language as the user terminal 2, and establish a communication connection with the selected target terminal 3.

In operation 304, the network service system 1 disconnects communication connections to the user terminal 2 and the target terminal 3, so that the user terminal 2 can directly communicate with the target terminal 3, and transfer information without using the network service system 1.

The foregoing operations are merely exemplary, and do not necessarily need to be performed according to a specific sequence.

Figure 4:
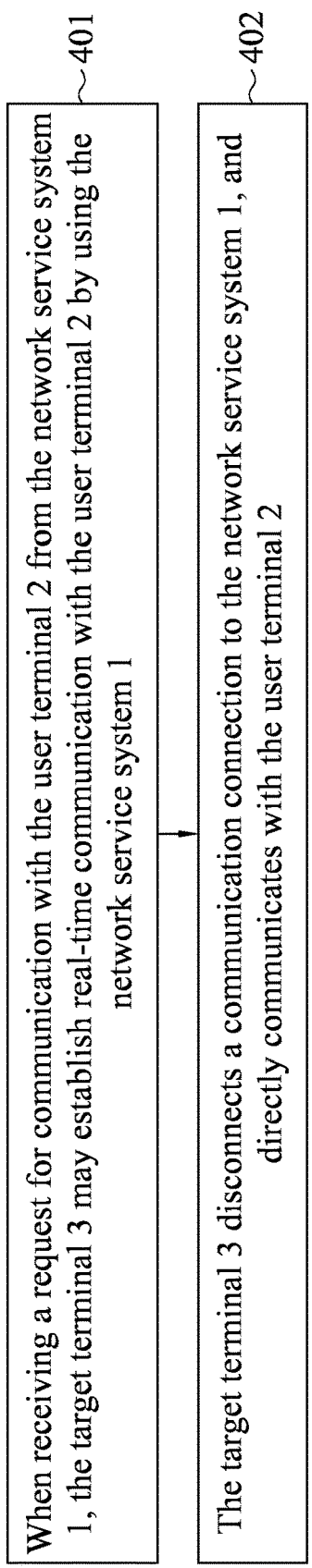
FIG. 4 is a schematic flowchart of steps of a network service method 400 in some embodiments of a target terminal 3 according to the present invention.

FIG. 4 is a schematic flowchart of steps of a network service method 400 in some embodiments of the target terminal 3 according to the present invention.

In operation 401, when receiving a request for communication with the user terminal 2 from the network service system 1, the target terminal 3 may establish real-time communication with the user terminal 2 by using the network service system 1.

In operation 402, the target terminal 3 disconnects a communication connection to the network service system 1, and directly communicates with the user terminal 2.

It should be understood that "an embodiment" or "embodiment one" mentioned throughout the specification means that specific features, structures, or properties relevant to the embodiments are included in at least one embodiment of the present invention. Therefore, throughout the specification, the occurrence of "in an embodiment" or "in embodiment one" may not necessarily refer to the same embodiment. In addition, these specific features, structures, or properties may be combined in one or more embodiments in any proper manner A person skilled in the art should also understand that the embodiments described in this specification all belong to optional embodiments, and the involved actions and modules are not necessarily required for the present invention.

It should be understood that sequence numbers of the foregoing processes do not mean necessary execution sequences in various embodiments of the present invention. The execution sequences of the processes should be determined according to functions and internal logic of the processes, and should not be construed as any limitation on the implementation processes of the embodiments of the present invention.

The flowcharts and block diagrams in the accompanying drawings of the present invention illustrate possible system architectures, functions, and operations that may be implemented by a system, a method, and a computer program product according to various embodiments of this application. In this regard, each block in the flowchart or the block diagram may represent a module, a program segment, or a part of a code. The module, the program segment, or the part of the code includes one or more executable instructions for implementing a specified logical function. It should also be noted that, in some implementation solutions used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined according to a related function. It should also be particularly noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The network service method and the network service system disclosed in the embodiments of the present invention are described above in detail. Specific examples are used in this specification to describe the principle and implementations of the present invention, but the foregoing descriptions of the embodiments are merely intended to help understand the method of the present invention and the core idea thereof. In addition, a person of ordinary skill in the art may make alterations to the specific implementations and application scope according to the idea of the present invention. In conclusion, the content of this specification shall not be understood as a limitation to the present invention. Any modification, equivalent replacement, or improvement made within the principle of the present invention shall fall within the protection scope of the present invention.

What is claimed is:

1. A network service system, operably communicating with a remote user terminal and a remote target terminal, the network service system comprising: a communication module and a data processor, wherein the data processor comprises a storage module, the storage module storing an identification code set by the network service system and at least one target code associated with the target terminal, the at least one target code representing at least one of a phone number of the target terminal, a social network account, and an application account related to the network service system; and the communication module is configured to receive a communication request from the user terminal, the communication request comprising the identification code; and the communication module is further configured to determine, according to the identification code, to establish a communication connection with the target terminal by using one of the at least one target code, so that the target terminal communicates with the user terminal in real-time by using an Internet Protocol (IP) network, wherein after establishing the real-time communication between the user terminal and the target terminal, the communication module disconnects respective communication connections between the network service system and the user terminal and the target terminal, so that the real-time communication between the user terminal and the target terminal is performed without using the network service system.

2. The network service system according to claim 1, wherein the at least one target code is updatable.

3. The network service system according to claim 1, wherein the target terminal communicating with the user terminal in real-time by using an IP network further comprises performing real-time communication by using a Public Switched Telephone Network (PSTN).

4. The network service system according to claim 1, wherein the data processor further comprises an identification module, configured to generate a target-specific identifier according to the identification code and an IP address of the network service system.

5. The network service system according to claim 1, wherein the communication module determines whether the identification code is in a service contract period of the network service system:
   if the identification code is in the service contract period of the network service system, the communication module establishes real-time communication between the user terminal and the target terminal by using the IP network; and
   if the identification code is not in the service contract period of the network service system, the communication module is incapable of establishing real-time communication between the user terminal and the target terminal.

6. The network service system according to claim 1, wherein the data processor is capable of setting, changing, or deleting the target code corresponding to a target-specific identifier.

7. The network service system according to claim 1, wherein a target-specific identifier is captured, photographed, scanned, touched, or mouse clicked by using the user terminal.

8. The network service system according to claim 1, wherein the real-time communication between the user terminal and the target terminal is video communication.

9. The network service system according to claim 1, wherein the real-time communication between the user terminal and the target terminal is voice communication.

10. The network service system according to claim 1, wherein the communication module is further configured to transfer information between the user terminal and the target terminal during real-time communication.

11. The network service system according to claim 1, wherein the network service system further comprises a detection module, configured to detect information about the user terminal.

12. The network service system according to claim 11, wherein the information about the user terminal comprises a language setting of the user terminal, and the communication module is further configured to determine, according to the language setting, to select the target terminal with the same language setting by using at least one of the target codes.

13. The network service system according to claim 11, wherein the information about the user terminal comprises location information of the user terminal, and the communication module is configured to transmit the location information of the user terminal to the target terminal.

14. The network service system according to claim 1, wherein a target-specific identifier comprises at least one or a combination of a one-dimensional barcode, a two-dimensional barcode, a specific pattern, a word, and a digit.

15. The network service system according to claim 12, wherein the data processor performs automatic translation for both the user terminal and the target terminal.

16. The network service system according to claim 11, wherein the information about the user terminal comprises user group information, and the communication module is further configured to determine, according to the user group information, to establish a communication connection to the target terminal by using a corresponding at least one of the target codes.

17. The network service system according to claim 11, wherein user information comprises user identification information, wherein the network service system compares the user identification information with a database related to the network service system or target terminal, to identify whether the user terminal corresponds to user data in the database.

18. A network service method, operable by a network service system, the network service method comprising the following steps:
   receiving a communication request from a user terminal, the communication request comprising an identification code associated with a target terminal; and
   determining, according to the identification code set by the network service system and comprised in the communication request, to communicably connect to the target terminal by using an Internet Protocol (IP) network, based on a target code, so that the user terminal communicates with the target terminal in real-time, the target code representing at least one of a phone number of the target terminal, a social network account, and an application account related to the network service system;
   after establishing the real-time communication between the user terminal and the target terminal, disconnecting respective communication connections between the network service system and the user terminal and the target terminal, so that the real-time communication between the user terminal and the target terminal is performed without using the network service system.

19. The network service method according to claim 18, wherein the target terminal communicates with the user terminal in real-time by using the IP network further comprises performing real-time communication by using a Public Switched Telephone Network (PSTN).

20. The network service method according to claim 18, wherein the target code corresponding to a target-specific identifier is set or updated.

* * * * *